United States Patent [19]
Miyamura et al.

[11] 3,787,288
[45] Jan. 22, 1974

[54] METHOD FOR PREPARING ALPHA-AMINOBENZYLPENICILLIN

[75] Inventors: Yoshinobu Miyamura, Hofu; Fumio Kato, Shizuoka; Ryo Okachi, Tokyo, all of Japan

[73] Assignee: Kyowa Hakko Kogyo Co., Ltd., Tokyo, Japan

[22] Filed: Oct. 14, 1970

[21] Appl. No.: 80,773

[30] Foreign Application Priority Data
Oct. 16, 1969  Japan.............................. 44-82241

[52] U.S. Cl................................................ 195/36 P
[51] Int. Cl............................................... C12d 9/20
[58] Field of Search.................................. 195/36 P

[56] References Cited
UNITED STATES PATENTS
3,682,777  8/1972  Nara et al.......................... 195/36 P Primary Examiner—Alvin E. Tanenholtz

[57] ABSTRACT

A process for the selective production of α-aminobenzylpenicillin from 6-aminopenicillanic acid, functional derivatives thereof and acid addition salts thereof whereby the reaction takes place in the presence of an α-aminobenzylpenicillin producing enzyme derived from a microorganism belonging to the genum Pseudomonas. Especially suitable are *Pseudomonas melanogenum* and *Pseudomonas ovalis*.

10 Claims, No Drawings

METHOD FOR PREPARING ALPHA-AMINOBENZYLPENICILLIN

BACKGROUND OF THE INVENTION

This invention relates to a method for preparing α-aminobenzylpenicillin from 6-aminopenicillanic acid (hereinafter referred to as 6-APA) and α-aminophenylacetic acid or functional derivatives and acid addition salts of such compounds by means of a microorganism or enzyme produced thereby.

α-aminobenzylpenicillin is an important, well known antibiotic and has therefore been the subject of much work. Current processes for producing this compound suffer from one or more disadvantages, however, leading the present inventors to conduct research into methods for preparing α-aminobenzylpenicillin by means of a microorganism.

Part of the problem attending the prior art processes is that the known enzymes are not greatly specific with respect to their ability to promote the formation of the desired α-aminobenzylpenicillin from 6-APA and α-aminoacetic acid. Penicillin acylase, produced by a well-known microorganism, is one such enzyme weak in substrate specificity.

In the prior art production of α-aminobenzylpenicillin, the 6-APA used as a starting material is usually derived from the hydrolysis of penicillin G. In addition to the 6-APA present in the hydrolysate there is also a quantity of phenylacetic acid as a result of the hydrolysis. Owing to the non-specificity of known enzymes, attempts at producing α-aminobenzylpenicillin from non-purified 6-APA to which α-aminophenylacetic acid has been added, result in a number of difficulties. For example, undesired penicillin G is reproduced from the phenylacetic acid and 6-APA, while the desired α-aminobenzylpenicillin is produced from the α-aminophenylacetic acid and 6-APA under the same conditions. Therefore, when α-aminobenzylpenicillin is produced from α-aminophenylacetic acid and 6-APA in the presence of phenylacetic acid, penicillin G is always produced as a by-product, thus requiring a large amount of 6-APA as a substrate. Moreover, separation of α-aminobenzylpenicillin from penicillin G is difficult. Accordingly, it has been deemed advantageous in the known methods to use purified 6-APA and thereby avoid these difficulties. It would be desirable indeed to have available microorganisms capable of synthesizing only α-aminobenzylpenicillin from phenylacetic acid-containing 6-APA as a substrate, thereby eliminating the step of purifying the 6-APA.

DETAILED EXPLANATION OF THE INVENTION

In accordance with the present invention, microorganisms have been found which elaborate an enzyme having strong and specific substrate and enzyme activity capable of synthesizing α-aminobenzylpenicillin in high yield not only without forming 6-APA from penicillin G at all, but also without being influenced by any phenylacetic acid contained in the reaction solution, and further without producing penicillin G as a by-product from α-aminophenylacetic acid or its derivative and 6-APA This fact is a new finding, which has been heretofore not reported at all in academic societies, and has a very important significance as an industrial scale process for producing α-aminobenzylpenicillin.

The present invention thus enables the direct use of, without purification, 6-APA from a mixed solution of 6-APA and phenylacetic acid obtained by the hydrolysis of penicillin G by penicillin acylase according to well-known methods. Further, α-aminobenzylpenicillin so produced can by readily purified thus resulting in a product which is produced at a lower cost in high yield and in large scale.

The process of the invention involves reacting α-aminophenylacetic acid with 6-APA in the presence of a microorganism which has strong substrate specificity and has no ability to form 6-APA from penicillin G. The substrates can be the free acids or functional derivatives thereof and acid addition salts as will be described in more detail below.

Any microorganism can be used so long as the microorganism has an enzyme activity which has a property to produce only α-aminobenzylpenicillin from 6-aminopenicillanic acid and α-aminophenylacetic acid or derivatives thereof, which does not form 6-APA at all from penicillin G and without producing penicillin G as a by-product, even if phenylacetic acid is contained in a reaction solution. Typical of such microorganisms is the genus Pseudomonas.

The process of the invention contemplates using the microorganism cell bodies alone, a culture liquor derived from culturing said microorganisms or the free isolated enzyme as will be described below. To obtain the cell bodies, culture liquor or free enzyme, the microorganisms are cultured in a nutrient medium so that the desired enzyme is produced. Culturing is preferably carried out for a sufficient time to allow extracellular accumulation of the enzyme as described below.

As a medium for culturing these microorganisms, there is employed a medium containing a suitable carbon source such as glucose, sucrose, starch, molasses, glycerine, sorbitol or natural products containing these substances. The medium further contains a suitable nitrogen source, for example a natural nitrogen source such as peptone, meat extract, yeast extract, cornsteep liquor, Mieki (soybean meal acid hydrolysate), glutamic acid, and the like or inorganic nitrogen sources such as urea, ammonia, ammonium sulfate, ammonium chloride, ammonium nitrate, and the like. Further, suitable amounts of inorganic salts such as phosphates (potassium primary phosphate, potassium secondary phosphate, and the like); magnesium salts such as magnesium sulfate; metal ions such as iron, sodium, potassium, manganese, zinc, calcium, and the like and anions such as chlorides and nitrates are preferably present. Other nutrient substances for the growth of these strains are added to the medium as needed.

Culturing is carried out under aerobic conditions, such as by shake-culturing or submerged culturing with aeration and agitation. Culturing temperature is 20°–50° C., preferably 28°–37° C. and culturing pH is 5.0–10.0, preferably 7.0–8.0. Culturing time is usually 6–48 hours. In this manner the synthesizing enzyme is formed in the cultured cell bodies and in the culture liquor as well.

As indicated above, the enzyme used in the process of the invention can be supplied in the form of the culturing liquor itself, the cell bodies themselves, or the free enzyme purified from a solution of ruptured cell bodies by salting-out with ammonium chloride, by a precipitation method using acetone or ethanol addition, by column chromatography, or the like. When the cell bodies are used as the enzyme source, a suspension solution of the cell bodies may be employed or acetone-dried cell bodies are used. When the culture liquor itself is used, the reactant substrates are added to the culture liquor for reaction, after the pH has been adjusted as indicated below for favorable reaction conditions.

The 6-APA substrate may be supplied as crude crystals of 6-APA obtained from the hydrolyzate of penicillin G, or a solution of 6-APA containing phenylacetic acid. It is usually present in the form of the ammonia, sodium and potassium slats.

The α-aminophenylacetic acid substrate may be used as the free acid or as a functional derivative thereof such as the amide, alkylesters such as methyl, ethyl, propyl, octyl and the like or as the alkali metal or alkaline earth metal salts such as the sodium, potassium or calcium salts. Additionally, either or both of the reactants may be used in the form of an acid addition salt thereof, especially those of the mineral acids typified by the hydrochloride, hydrobromide, hydroiodide, the hydrogen phosphate or the hydrogen sulfate compounds.

The reaction between the substrates is carried out in a reaction solution prepared by adding the substrates and a suitable amount of the enzyme preferably to a buffer solution at a constant pH, or by adding the two substrates to the fermentation liquor itself, as described above. Suitable reaction pHs are in a wide range of 3–8, but a particularly suitable pH for the present reaction is 5.5–6.5. The reaction temperature is 25°–50° C., preferably 30°–37° C. The reaction is preferably carried out for 1 to 24 hours.

After the completion of the reaction, α-aminobenzylpenicillin can be readily isolated by known methods such as by transfer extraction or precipitation with an organic solvent; by ion exchange, or by column chromatography. Isoelectric point precipitation may be used as well.

α-aminobenzylpenicillin is a broad spectrum antibiotic effective against a gram positive and negative pathogenic bacteria. Dosage of α-aminobenzylpenicillin required for oral administration is from about 1 to 6 g. per day.

Example 1

The strain, *Pseudomonas melanogenum* ATCC 17808 is used as a seed microorganism and a medium comprising 1 percent peptone, 1 percent meat extract, 0.5 percent yeast extract and 0.3 percent sodium chloride is used as a seed medium. One platinum loop of the strain is inoculated into 300 ml. of the seed medium in a 2 l. conical flask and cultured at 30° C. for 24 hours with shaking. The thus obtained seed culture liquor is then inoculated in 1. 1. of the main fermentation medium described below in a 5 l. jar fermentor.

Composition of the main fermentation medium is as follows: 1 percent peptone, 1 percent yeast extract, 0.5 percent meat extract, 0.5 percent sodium glutamate, 0.25 percent sodium chloride, pH before sterilization; 7.3 (adjusted with 5N NaOH).

Agitating condition: 300 r.p.m.
Aeration rate: 3 l./min.
Temperature: 30° C.

Culturing is carried out for 24 hours, while the pH of the system is adjusted to 7.5 during the culturing (with a mixed solution of 10 percent glutamic acid and 6 percent sulfuric acid). After the fermentation cell bodies are separated from the fermentation liquor by centrifugal precipitation, and suspended in a 1/30 M phosphoric acid buffer solution of pH 6.0 so that the cell bodies have a concentration of about 5 mg./ml. on a dry basis. No formation of 6-APA is observed at all even if penicillin G is allowed to act upon the resulting suspension of the cell bodies.

Crude powders of 6-APA containing phenylacetic acid and α-aminophenylacetic acid amide are added to the cell suspension so that the 6-APA is at a level of 10 mg./ml. of 6-APA and the latter α-aminophenylacetic acid is at a level of 25 mg./ml. The thus prepared reaction solution is subjected to reaction at 35° C. for 3 hours. The amount of α-aminobenzylpenicillin thus formed in the reacting solution is 8.5 mg./ml. No formation of by-product penicillin G is observed at all.

The reaction solution is adjusted to pH 4.0 with hydrogen chloride and centrifuged. 1 l. of the supernatant is passed through a column packed with Dowex 50W x 4 (a strongly acidic cation exchange resin available from The Dow Chemical Co., U.S.A.) to adsorb α-aminobenzylpenicillin thereon. The resin is eluted with 0.2 M citrate buffer (pH 4.25) and then with 0.03 M citrate phosphate buffer (pH 7.0). The active fraction is concentrated and desalted with Sephadex G-10 (dextran available from Pharmacia Fine Chemicals Inc., U.S.A.). The desalted concentrate is adsorbed on active charcoal and eluted with 50 percent aqueous methanol. The eluate is freeze-dried to give crude powder of α-aminobenzylpenicillin. After recrystallization from water (pH 4.0), 4.2 g. of pure α-aminobenzylpenicillin is obtained.

Example 2

The strain *Pseudomonas melanogenum* ATCC 14535 is seed-cultured in the same manner as in Example 1, and 1.8 l. of the seed culture is inoculated in 100 l. of the seed culture medium sterilized in a 200 l. capacity tank. Culturing is carried out with agitation at 250 r.p.m. at an aeration rate of 60 l./min. and at a temperature of 30° C. for 24 hours. Then, 1 k. of main fermentation medium is sterilized in a 2 kl. capacity tank in the same manner as in Example 1, and 100 l. of seed culture liquor, as cultured in the above-mentioned manner, is inoculated in the main fermentation medium.

Culturing is then carried out with stirring at 100 r.p.m., at an aeration rate of 200 l./min. and at a temperature of 30°C. for 12 hours, while adjusting the pH during the culturing to 7.5 in the same manner as in Example 1.

No formation of 6-APA is observed at all, even if penicillin G is allowed to act upon the thus obtained culture liquor. Further, one volume of a decomposate solution by penicillin acylase of penicillin G (6-APA content: 20 mg./ml.) obtained according to well-known methods in added to one volume of the main culture liquor, and 25 mg./ml. of the methyl ester of α-aminophenylacetic acid hydrochloride is added thereto, and the reaction carried out with stirring at 100 r.p.m. at a temperature of 35° C. for 3 hours with no aeration, while adjusting the pH to 6.0 with ammonia. The amount of α-aminobenzylpenicillin thus formed in the reacting solution is 8.9 mg./ml. No formation of by-product penicillin G is observed at all.

Example 3

The strain *Pseudomonas ovalis* ATCC 15175 is seed-cultured in the same manner as in Example 1, and 1.5 l. of the seed culture inoculated in 15 l. of main fermentation medium placed in a 30 l. capacity jar fermentor.

Composition of the main fermentation medium is 2.5 percent Mieki, 1.0 percent peptone, 0.5 percent sodium glutamate, 0.02 percent potassium primary phosphate, and 0.02 percent magnesium sulfate; pH before the sterilization: 7.2.

Culturing is carried out with agitation at 250 r.p.m., at an aeration rate of 10 l./min. and at a temperature of 30° C. for 24 hours, while adjusting the pH during the culturing to 7.5 in the same manner as in Example 1. No formation of 6-APA is observed, even when penicillin G is allowed to act upon the thus obtained culture liquor. The reaction of the substrates is carried out in the same manner as in Example 2, using the culture liquor as the source of enzyme.

The amount of α-aminobenzylpenicillin thus formed in the reacting solution is 7.4 mg./ml., and no formation of by-product penicillin G is observed at all.

We claim:

1. A method for producing α-aminobenzylpenicillin, which comprises reacting (crude) 6-aminopenicillanic acid, containing phenylacetic acid as an impurity, with α-aminophenylacetic acid derivatives, or acid addition salts thereof in the presence of a microorganism belonging to the genus Pseudomonas or enzyme material derived from said microorganism, said microorganism and enzyme material having the property of forming α-aminobenzylpenicillin from 6-aminopenicillanic acid and α-aminophenylacetic acid and no ability for forming penicillin G from 6-aminopenicillanic acid and phenylacetic acid.

2. The method of claim 1 wherein the reaction is carried out at a pH of from 3 to 8 and at a temperature of from 25° to 50° C.

3. The method according to claim 2 wherein the pH is from 5.5 to 6.5 and the temperature is from 30° to 37° C.

4. The method according to claim 2 wherein the reaction is carried out for from 1 to 24 hours.

5. The method according to claim 1 wherein the enzyme is produced by aerobically culturing the microorganism in a nutrient medium at a temperature of from 20° to 50° C. and a pH of from 5 to 10.

6. The method according to claim 1 wherein the enzyme is contained in the cell bodies of said microorganisms and the reaction is carried out in the presence of said cell bodies.

7. The method according to claim 1 wherein the enzyme is present in a culture liquor obtained from said microorganism and the reaction is carried out in the presence of said culture liquor.

8. The method according to claim 1 wherein the microorganism is a strain of *Pseudomonas melanogenum*.

9. The method according to claim 1 wherein the microorganism is a strain of *Pseudomonas ovalis*.

10. The process of claim 1 when said microorganism is a member selected from the group consisting of *Pseudomonas melanogenum* ATCC 17808, *Pseudomonas melanogenum* ATCC 14535 and *Pseudomonas ovalis* ATCC 15175.

* * * * *